Patented Apr. 15, 1952

2,592,646

UNITED STATES PATENT OFFICE 2,592,646

REGENERATION AND PRECONDITIONING OF A METHANETHIOL SYNTHESIS CATALYST

Richmond T. Bell, Grays Lake, Ill., assignor to The Pure Oil Company, Chicago, Ill., a corporation of Ohio No Drawing. Application October 7, 1948, Serial No. 53,380

9 Claims. (Cl. 252—416)

This invention relates to a process of preparing a catalyst for reaction so that the catalyst will not require a lengthy induction period before reaching maximum activity when it is put to use. In particular, the invention embodies the method of pretreating the catalyst, following preparation of the fresh catalyst or regeneration, with a reactant to prepare the surface thereof for immediate use at a high level of efficiency.

In catalytic operations, it is a common observation that many catalysts require an induction period before they will come up to optimum activity. This induction period refers to the time during which the catalyst is maintained under substantially reaction conditions, but yet is below an optimum level in its efficiency of conversion. The period varies in length, but it is often observed with freshly prepared catalysts and with regenerated catalysts.

Whenever the induction period is encountered, it represents an economic loss, for it corresponds to a period during which the process is being carried out or the equipment in which it is conducted is being operated, and a low yield is obtained. The methods for avoiding it are few and relatively ineffective, for they represent in general a compromise with the conditions which tolerate the loss of productivity.

Accordingly, it is a fundamental object of this invention to provide a step in a method of preparing a catalyst or regenerating a catalyst so that the induction period in subsequent use of that catalyst is substantially reduced or avoided.

I have found that if a freshly prepared or regenerated catalyst is subjected to an operation in which it is exposed to pressure-temperature conditions substantially milder than the reaction conditions in which it is to be used in an atmosphere of one of the reactants of the reaction mixture for which it is a catalyst, such induction period as the catalyst might tend to exhibit before maximum activity is developed is substantially shortened and the catalytic activity thereof is improved.

It is commonly observed in the art that when a regenerated catalyst is returned to the reaction zone for use in a given reaction, an induction period of rather variable duration is necessary before the catalyst will reach maximum or operating activity, which level is quite frequently lower than the original activity of a freshly prepared catalyst. I have found that by passing one of the reactants, for example, the organic reactant in an addition reaction, over and through the catalyst after regeneration and before it is used with the reaction mixture, under comparatively mild conditions, the induction period normally required for re-establishing maximum activity of the catalyst is very substantially reduced or eliminated entirely. Further, I have found that the maximum activity of the regenerated catalyst, if so treated, either is equal to the optimum activity of the original catalyst or approaches it more closely than a conventional regenerated catalyst. Similarly, freshly prepared catalysts subjected to this preliminary conditioning show a reduced induction period.

For example, in the preparation of thiols and thioethers from methanol and hydrogen sulfide, a catalyst consisting of thoria supported on pumice, activated alumina, silica gel, or activated carbon is an excellent one for accelerating the reaction. The catalyst, in the normal course of events, loses some activity and becomes partly exhausted, largely due to the formation of various complex sulfur and carbon compounds on the surface thereof. Regeneration of the catalyst is accomplished by heating it in a stream of oxygen, gases containing free oxygen, or oxidizing gases.

The practice of the invention and the effect thereof will be more readily understood from a consideration of the following:

*Example.*—An apparatus consisting essentially of methanol pump and vaporizer and a source of hydrogen sulfide, a preheater for reactant vapors, and a reaction chamber connected to condensers and receivers, was assembled, the reaction chamber being charged with thoria supported on purified pumice as the catalyst. Methanol and hydrogen sulfide in substantially the stoichiometric ratio for carrying out the formation of methyl mercaptan were passed at substantially atmospheric pressure through the preheater, raised therein to a temperature of about 335° to 375° C., and passed over the catalyst at a space velocity of 625 to 650. Unreacted methanol and hydrogen sulfide were recovered without recirculation. The product was obtained by fractional condensations of the effluent gases from the reaction zone. In continuous operation of the process, separation of converted materials from the effluent gases is followed by recirculation of the unreacted or unconverted gases through the reaction zone.

Parallel tests were made following the technique outlined in which all variable conditions were kept substantially identical with the exception that the catalyst was changed. The catalyst was divided into two portions, the first of which was used as prepared to conduct a test in accordance with the procedure as outlined. The second portion of catalyst was preconditioned by exposing it for a period of 1 hour to a current of methanol at a temperature of 300° C. The results of the two experiments are tabulated below.

*Table*

| Variable | Catalyst Without Pretreatment | Catalyst With Pretreatment |
|---|---|---|
| Test Duration, hours | 4.00 | 4.00 |
| Pressure, mm. of mercury | 746.4 | 740.8 |
| Catalyst Temperature, °C | 380. | 380. |
| Flow Hydrogen Sulfide, gm./hr | 99.3 | 97.7 |
| Flow Methanol, gm./hr | 91.8 | 94.6 |
| Charge ratio—Mol $H_2S$/mol $CH_3OH$ | 1.015 | 0.972 |
| Space Velocity | 648. | 636. |
| Total Recovery, gm | 761.7 | 762.2 |
| Material Balance, per cent weight | 99.6 | 99.1 |
| Quantity $CH_3SH$, gm | 57.0 | 79.5 |
| Quantity $(CH_3)_2S$, gm | 20.7 | 26.8 |
| Quantity $H_2S$, gm | 347.0 | 328.1 |
| Quantity $CH_3OH$, gm | 303.7 | 282.5 |
| Quantity $H_2O$, gm | 33.3 | 45.3 |
| Yield, $CH_3SH$, per cent weight of total rec'y | 7.48 | 10.43 |
| Yield, $(CH_3)_2S$, per cent weight of tot. rec'y | 2.72 | 3.52 |
| Total Conversion, per cent of $CH_3OH$ Chg | 16.2 | 21.9 |

Confirmatory tests made in accordance with the outline given in the example showed that the catalyst could be regenerated and conditioned for a short period, about 1 hour, in the presence of methanol in accordance with the procedure outlined and that the improved conversion was reproducible. That is, in every case in which the catalyst was subjected to a preliminary exposure to the methanol reactant, the induction period of the catalyst was substantially eliminated as demonstrated by the improved conversion over the period of time it was used in the reactor.

Similar experiments in which other alcohols were converted to corresponding thiols and sulfides with the thoria-pumice and other catalysts substantiated the general observation.

Examples of other catalytic reactions illustrating the method of preconditioning a catalyst by exposure thereof to an atmosphere of vapors of one of the reactants are numerous.

In oxidation reactions where a hydrocarbon is converted to an oxygen containing material, as for example, the oxidation of naphthalene with air to form phthalic anhydride by passing a mixture of naphthalene and air over a vanadium pentoxide catalyst at about 300° to 350° C., the conversion can be improved by preconditioning freshly prepared catalyst or freshly regenerated catalyst by exposure thereof to an atmosphere of naphthalene at a temperature of about 250° to 275° C., for a period of at least about 5 to 10 minutes.

A typical hydration reaction is one in which ethylene and water vapor are reacted to form ethyl alcohol over a cadmium meta-phosphate catalyst at about 175° to 275° C. In this instance, the conversion per pass can be improved, or induction period reduced, by preconditioning the catalyst at a temperature of about 140° to 160° C. Similar considerations apply to dehydration reactions, such as the reaction of ammonia and ethanol to form ethyl amine and diethyl amine over activated alumina at 300° to 350° C. Here the preconditioning of the catalyst is effective to reduce the induction period when carried out at temperatures from about 250° to 275° C.

Hydrogenation reactions constitute another type and, in particular, the reaction of carbon disulfide and hydrogen over a cobalt catalyst at 250° C. to form methanethiol and dimethyl thioether serves as an example. Here the preconditioning of the catalyst is carried out in an atmosphere of either reactant at a temperature of about 215° to 235° C.

The reaction of isooctenes over a nickel catalyst with hydrogen at a temperature of 150° to 175° C. gives greater conversion per pass when the catalyst is preconditioned at a temperature of about 100° to 125° C. in an atmosphere of either reactant.

Dehydrogenation reactions, such as the reaction of ethyl alcohol to form acetaldehyde and hydrogen over a copper catalyst at 275° to 350° C. are improved when the catalyst is preconditioned in an atmosphere of ethyl alcohol at a temperature of about 230° to 260° C.

Gaseous paraffins, such as butanes are converted to butenes and hydrogen over chromia-alumina catalysts at 550° to 700° C., and normal heptanes are converted to toluene and hydrogen over the same type of catalyst at about 550° C. Cracking reactions, such as the cracking of gas oil to form gasoline, gases and residue in the presence of alumina-silica catalysts are carried out at 425° to 550° C. The catalyst is effectively preconditioned by exposure thereof to an atmosphere of the hydrocarbon reactant at a temperature close to but below the temperature of incipient reaction. The depolymerization of olefinic polymers to form lower polymers or monomers where it is carried out over a silica-alumina catalyst at 250° to 500° C. results in a better operation when the catalyst is exposed to an atmosphere of polymer vapor at a temperature below the temperature of reaction. Likewise, the isomerization of normal butane to form isobutane over an aluminum chloride catalyst at 100° C. is improved by preconditioning the catalyst at a temperature below reaction temperature. In general, the best temperature for preconditioning is at a level about 10 or 20 per cent below incipient reaction temperature for the process.

In alkylation, polymerization and other condensation reactions, such as the reaction of benzene and propene to form propyl benzene over a silica-alumina catalyst at 250° to 350° C., preconditioning would be carried out at a temperature from about 200° to 225° C., in an atmosphere of one of the reactants. Similar considerations apply to the polymerization of olefins over supported phosphoric acid catalysts at 200° to 250° C.

When isobutyl alcohol is condensed with hydrogen chloride to form isobutyl chloride over an alumina-zinc chloride catalyst at a temperature of 250° to 400° C., effective preconditioning of the catalyst is accomplished by exposing it to an atmosphere of the alcohol or the acid at a temperature of about 200° to 225° C. The reaction of methane and chlorine to form carbon tetrachloride over activated carbon at 300° to 400° C., a typical halogenation reaction, is improved in effectiveness when the catalyst is preconditioned at about 225° to 275° C.

A nitration, such as the vapor phase reaction of benzene and nitrogen dioxide to form mononitrobenzene over a silica gel catalyst at 250° to 350° C., results in improved conversions when the silica gel is preconditioned by exposure to an atmosphere of the benzene or nitrogen dioxide at about 200° to 225° C. A sulfurization reaction, such as that between methane and sulfur to form carbon disulfide over a silica gel catalyst at 500° to 700° C., gives improved conversions when the catalyst is preconditioned in the presence of methane or sulfur vapor at a temperature of about 400° to 450° C. Desulfurization of hydrocarbon oils in the presence of hydrogen over catalysts, such as cobalt molybdate-alumina catalysts at 275° to 400° C., is improved when the catalyst is preconditioned by exposure to an atmosphere of the hydrocarbon at a temperature of about 225° to 250° C.

The addition of hydrogen sulfide to triisobutylene to form tertiary dodecyl mercaptans over a silica-alumina catalyst at 125° to 175° C., or similarly, the reaction of ethylene and hydrogen chloride to form ethyl chloride over a supported zirconium oxychloride catalyst at 150° to 200° C., will result in improved conversion per pass when the catalyst is pretreated with vapors of one of the reactants at a temperature close to but below that of incipient reaction. In the case of hydrogen sulfide and triisobutylene, the temperature would be about 95° to 110° C.; in the case of ethylene and hydrogen chloride, the preferred preconditioning temperature would be 120° to 135° C.

It will be found in general that the process of preconditioning catalysts reduces the induction period, whether it be freshly prepared or regenerated, is effective in all types of heterogeneous gas-solid and liquid-solid catalytic reactions, and that any single reactant may be used, but the preconditioning is preferably carried out in an atmosphere of the organic reactant. The preferred preconditioning temperature is in a range about 10 to 20 per cent below that of incipient reaction, which, as a practical matter, will approximate the lower limit of a useful operating range. In general, the preconditioning temperature will be found to be about 50° to 100° or 150° C. below the optimum operating temperature for most ordinary processes.

In the case of a catalyst being conditioned for the synthesis of methyl mercaptan from methanol and hydrogen sulfide, the freshly prepared or regenerated catalyst is preferably put in condition for use by sweeping the system clear with nitrogen or other inert gas, substituting methanol vapor for nitrogen, and continuing flow through the catalyst for about 0.2 to 2.0 hours after the system is substantially clear of nitrogen and after temperatures of 50° to 100° or 150° C. below operating or optimum temperatures have been reached. Flushing the system with nitrogen or other inert gas can be omitted in most instances if desired but is preferably included in this particular case to assure that no oxygen or other possible oxidants are in the system to react with the reactants or products of the methanethiol synthesis. The catalyst pretreated in this manner is superior to a conventionally prepared or regenerated catalyst as shown by the substantial improvement in conversion per pass noted in the examples given.

In general, when more than one reactant is being used, passage of one of the reactants over a catalyst for 0.2 to 4 hours after the reactor system is completely purged of whatever atmosphere was initially present and after temperatures of 50° to 150° C. below optimum temperatures have been reached is sufficient for preconditioning. In the preconditioning process, the single reactant usually is passed at a space velocity about the same as that for total reactants during operation, but for convenience, it is often preferred to use a space velocity corresponding to the fraction the single reactant is of the total during operation in order that the change from preconditioning to operation can be accomplished most easily in the shortest time.

Thus, if equimolar proportions of two reactants are used in a reaction, at a space velocity of 100, preconditioning of the catalyst is preferably carried out in an atmosphere of one of them at a space velocity of 50.

In the case of a single reactant, preconditioning is carried out by passing the reactant over and through the catalyst for about 0.2 to 4.0 hours after the reactor system has been completely purged by the reactant and after temperatures of 10° to 25° C. below incipient reaction temperature have been reached.

In similar fashion, a freshly prepared catalyst in which a starting compound has been decomposed or reacted on a support to form an oxide, sulfide, element, etc., can be surface-treated in the presence of one of the reactants in the process contemplated. For example, where a silica-supported thoria catalyst is to be used in the preparation of thiols and thioethers from hydrogen sulfide and alcohols, or from hydrogen sulfide and unsaturated hydrocarbons, the regeneration or final preparatory step in making the catalyst preferably should be carried out by exposing it to the alcohol or hydrocarbon vapors, as the case may be, for a period of time sufficient to condition the surface of the catalyst for the reaction as described. Where this is appropriately done, I have found that the catalyst surface is modified or conditioned for the reaction and the induction period which the catalyst will ordinarily require to come up to optimum activity is substantially eliminated.

Thus, although the invention has been described with only a limited number of specific examples, they illustrate the many ramifications of the process applied to the preparation and regening atmosphere at a temperature at least 25° C. illustrative of the scope of the invention and not restrictive thereof.

What is claimed is:

1. The method of regenerating a catalyst which has accumulated a deposit of carbonaceous and other generally inhibitory substances by long exposure to reaction conditions in the synthesis of methanethiol from methyl alcohol and hydrogen sulfide which comprises, burning off foreign materials from the catalyst in an oxidizing atmosphere at a temperature at least 25° C. below the sintering temperature of the catalyst, subjecting the catalyst to an atmosphere of methyl alcohol vapor, maintaining the catalyst in said atmosphere for a period of 0.2 to 2.0 hours at a temperature about 50° to 150° C. below operating temperature for the methanethiol synthesis operation, thereby to regenerate the catalyst, eliminate its induction period and condition its surface for further use.

2. The method in accordance with claim 1 in which the catalyst is thoria.

3. The method in accordance with claim 2 in which the operating temperature is 335° to 380° C.

4. The method of regenerating a catalyst which has accumulated a deposit of carbonaceous and other generally inhibitory substances by long exposure at operating temperature in the synthesis of methanethiol from methyl alcohol and hydrogen sulfide, which comprises, burning off foreign materials from the catalyst in an oxidizing atmosphere at a temperature at least 25° C. below the sintering temperature of the catalyst, thereafter subjecting the catalyst to an atmosphere of methyl alcohol vapor, maintaining the catalyst in said atmosphere for a period of 0.2 to 2.0 hours at a temperature 10° to 25° C. below the incipient reaction temperature for said synthesis, thereby to regenerate the catalyst, eliminate its induction period and condition its surface for further use.

5. The method in accordance with claim 4 in which the catalyst is thoria.

6. The method in accordance with claim 5 in which the operating temperature is 335° to 380° C.

7. The method of preconditioning a catalyst for use in the synthesis of methanethiol from methyl alcohol and hydrogen sulfide at elevated temperatures, which comprises subjecting the catalyst to an atmosphere consising of methyl alcohol vapors at a temperature about 50° to 150° C. below operating temperature for the methanethiol synthesis operation, thereby to eliminate its induction period and condition its surface for the methanethiol synthesis.

8. The method in accordance with claim 7 in which the catalyst is thoria.

9. The method in accordance with claim 8 in which the operating temperature is 335° to 380° C.

RICHMOND T. BELL.

REFERENCES CITED

The following references are of record in the file of this patent:

UNITED STATES PATENTS

| Number | Name | Date |
|---|---|---|
| 1,943,821 | Hanks et al. | Jan. 16, 1934 |
| 2,239,000 | Groombridge et al. | Apr. 22, 1941 |
| 2,276,693 | Heath | Mar. 17, 1942 |
| 2,353,552 | Drennan | Aug. 7, 1945 |
| 2,381,677 | Matuszak | Aug. 7, 1945 |
| 2,419,470 | Teter | Apr. 22, 1947 |
| 2,458,487 | Crowley | Jan. 4, 1949 |
| 2,461,570 | Roberts | Feb. 15, 1949 |
| 2,462,861 | Gunness | Mar. 1, 1949 |
| 2,465,314 | Mosesman | Mar. 22, 1949 |
| 2,478,899 | D'Ouville | Aug. 16, 1949 |